No. 876,978. PATENTED JAN. 21, 1908.
A. J. LEHMAN.
AUTOMOBILE AXLE.
APPLICATION FILED SEPT. 27, 1907.
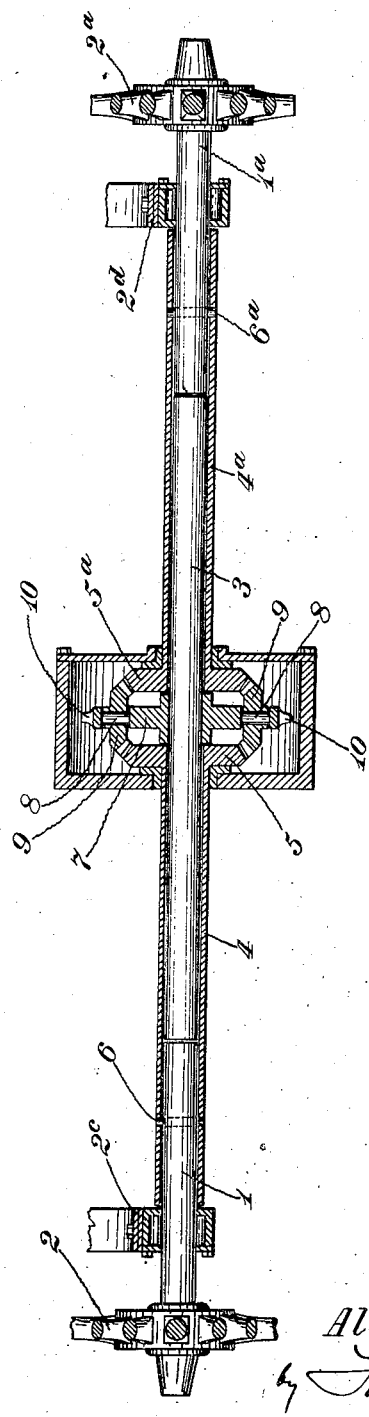
Witnesses
Benj. Finckel
Alice B. Cook
Inventor
Albert J. Lehman
by Finckel & Finckel
his Attorneys

UNITED STATES PATENT OFFICE.

ALBERT J. LEHMAN, OF COLUMBUS, OHIO.

AUTOMOBILE-AXLE.

No. 876,978.  Specification of Letters Patent.  Patented Jan. 21, 1908.

Application filed September 27, 1907. Serial No. 394,788.

*To all whom it may concern:*

Be it known that I, ALBERT J. LEHMAN, a citizen of the United States, residing at Columbus, in the county of Franklin and State of Ohio, have invented a certain new and useful Improvement in Automobile-Axles, of which the following is a specification.

The object of this invention is to provide a cheap, simple and strong axle especially adapted for use in automobiles.

The invention is embodied in the construction hereinafter described and claimed, reference being had to the accompanying drawings, in which the view illustrates the internal members in full and the external parts in section, taken longitudinally with reference to the axle.

In said drawing the characters 4 and $4^a$ designate two tubes placed axially in line with each other, the adjacent or inner ends of said tubes having affixed thereto large bevel gears 5 and $5^a$ while the outer ends of said tubes contain stud shafts or pins 1 and $1^a$ secured in place by suitable fastening devices, as for example, pins 6 and $6^a$ driven through said tubes and the stud shafts. The stud shafts 1 and $1^a$ project beyond the ends of the tubes and receive the wheels 2 and $2^a$. The body of the vehicle can also be supported on said stud shafts as seen at $2^c$ and $2^d$. Fitting closely and rotarily within the inner portions of the tubes 4 and $4^a$, and between the ends of the stud shafts 1 and $1^a$ is a cylindrical bar or member 3 adapted to hold the tubes 4 and $4^a$ in line and the axle, as a whole, from flexing at the middle, said bar having affixed thereto a spider 7 containing spindles 8 to receive small bevel gears or pinion 9 adapted to mesh with the bevel gears 5 and $5^a$. The rim of the spider 7 is shown to be provided with sprocket teeth 10 to receive a driving chain. Power applied through the chain to the spider, of course, drives the tubes 4 and $4^a$ and the wheels attached to the members 1 and $1^a$, but the intermediate gearing described permits a differential motion of the wheels. The differential gearing can be inclosed by means of a suitable housing, suitable openings being provided from said housing for the passage of the driving chain or other driving mechanism. The housing also provides means to keep the axle from spreading.

From the construction shown it will be observed that the axle is strong and cheaply manufactured; that the tubes add great strength and the intermediate member 3 amply braces the tubes and affords an efficient support for the spider.

What I claim and desire to secure by Letters Patent is:

1. In an axle, the combination of the two tubes placed axially in line with each other, said tubes having gears affixed thereto at their inner or adjacent ends and stud shafts secured projectingly in their outer ends for the reception of the vehicle wheels, a bar loosely inclosed within the inner portion of said tubes adapted to hold said tubes in line and brace the axle from flexing at the middle, said bar provided with a spider, a gear on said spider to mesh with the said gears on the tube, and means whereby said spider may be driven.

2. In an axle, the combination of the two tubes placed axially in line with each other, said tubes having gears affixed thereto at their inner or adjacent ends and stud shafts secured projectingly in their outer ends for the reception of the vehicle wheels, a rotary bar inclosed and closely fitting within the inner portions of said tubes adapted to hold said tubes in line and brace the axle from flexing at the middle, said bar provided with a spider, a gear on said spider to mesh with the said gears on the tubes, and means whereby said spider may be driven.

ALBERT J. LEHMAN.

Witnesses:
ERNEST F. KOPSCH,
WILLIAM H. SCHULZ.